(12) United States Patent
Torkki

(10) Patent No.: US 6,771,757 B1
(45) Date of Patent: Aug. 3, 2004

(54) METHOD FOR PRODUCING A SERVICE PROFILE BASED ON USER'S CHOICE FOR AN EXTENSION IN A TELECOMMUNICATIONS NETWORK

(75) Inventor: Markus Torkki, Helsinki (FI)

(73) Assignee: Sonera Oy, Helsinki (FI)

( * ) Notice: Subject to any disclaimer, the term of this patent is extended or adjusted under 35 U.S.C. 154(b) by 0 days.

(21) Appl. No.: 09/398,487

(22) Filed: Sep. 17, 1999

(30) Foreign Application Priority Data

Mar. 17, 1997 (FI) .................................................. 971114
Jan. 28, 1998 (FI) .................................. PCT/FI98/00089

(51) Int. Cl.[7] .............................................. H04M 3/42
(52) U.S. Cl. .............................. 379/201.02; 379/142.09; 379/213.01
(58) Field of Search ...................... 379/142.09, 142.1, 379/201.01, 201.02, 201.03, 201.11, 221.08, 230, 207.14, 207.15, 211.01, 213.01

(56) References Cited

U.S. PATENT DOCUMENTS

| | | | | |
|---|---|---|---|---|
| 5,274,699 A | * | 12/1993 | Ranz ..................... | 379/142.09 |
| 5,283,824 A | * | 2/1994 | Shaw ..................... | 379/142.09 |
| 5,329,578 A | * | 7/1994 | Brennan et al. ....... | 379/211.03 |
| 5,465,295 A | * | 11/1995 | Furman ................. | 379/221.14 |
| 5,475,744 A | * | 12/1995 | Ikeda ..................... | 379/127.01 |
| 5,521,969 A | * | 5/1996 | Paulus et al. .......... | 379/142.02 |
| 5,590,184 A | * | 12/1996 | London ................. | 379/142.09 |
| 5,832,061 A | * | 11/1998 | Rubin ...................... | 379/88.1 |
| 5,832,072 A | * | 11/1998 | Rozenblit .................... | 379/246 |
| 5,901,209 A | * | 5/1999 | Tannenbaum et al. . | 379/142.09 |
| 6,252,953 B1 | * | 6/2001 | Gruchala et al. ...... | 379/207.01 |

FOREIGN PATENT DOCUMENTS

| | | |
|---|---|---|
| DE | 44 24 896 A1 | 1/1995 |
| EP | 0 531 947 A3 | 3/1993 |
| EP | 0 715 442 A3 | 7/1996 |
| GB | 2 280 334 A | 1/1995 |
| WO | WO 93/16549 | 8/1993 |
| WO | WO 97/48243 | 12/1997 |

OTHER PUBLICATIONS

Bellcore. TR–TSY–000031, Calling Number Delivery, Jun. 1988, Issue 2, pp. 1–6.*

* cited by examiner

*Primary Examiner*—Bing Bui
(74) *Attorney, Agent, or Firm*—Cohen, Pontani, Lieberman & Pavane

(57) ABSTRACT

A procedure for creating a service profile dependent on user selection for a subscription in a telecommunication network. The invention makes it possible to use a single subscription in a telecommunication network with several different subscriber numbers, each number being associated with an optional user-selected service profile.

3 Claims, 4 Drawing Sheets

METHOD FOR PRODUCING A SERVICE PROFILE BASED ON USER'S CHOICE FOR AN EXTENSION IN A TELECOMMUNICATIONS NETWORK

BACKGROUND OF THE INVENTION

1. Field of the Invention

The present invention relates to a procedure for creating a service profile, dependent on the user's selection, for a subscription in a telecommunication network. The invention makes it possible to use several optional telephone numbers to utilize or access a telecommunication network subscription, each number being associated with an optional service profile dependent on the user's selection.

2. Description of the Related Art

In the prior art, call setup in a telecommunications network is usually based on a number selection made by the calling subscriber. In other words, the calling subscriber selects via his/her terminal an address, i.e. the number of the called subscription, on the basis of which the switching and exchange system connects the calling subscriber's terminal or system to the called subscriber.

Previously, also known is also a terminal-dependent and/or network-dependent "dual numbering" solution used in the DCS system (Digital Cellular System). In this case, the DCS telephone has two numbers and the user can select which one of them is to be active. When receiving a call on such a telephone, the user can see which one of the lines is being used. A problem with this solution is that it is dependent on the terminal and/or network, i.e. it can only be utilized by using DCS terminals. Moreover, to implement this solution, changes are required in the mobile communication switching center.

OBJECT AND SUMMARY OF THE INVENTION

The object of the present invention is to reduce the problems described above and to produce a new procedure for creating a user selectable service profile for a telecommunication network subscription, a procedure that is independent of the telecommunication network and/or terminal.

In the procedure of the invention, a subscription in the telecommunication network is given or assigned several subscriber numbers, i.e. an optional number of subscriber numbers. When different subscriber numbers are, provided for use by a subscriber, the A-ID used in call signaling, i.e. the A-number or the caller's telephone number that is displayed to the called subscriber at the receiving end, will be different for each call, depending on the calling user's selection.

Thus, the user of a subscription can selectively decide for each call which subscriber identity, i.e., which available A-ID, is to be sent to the receiver and/or charged. Correspondingly, when calls are made to these different subscriber numbers, the receiving caller's A-ID will be displayed differently depending on which one of the available subscriber numbers is being called.

For the various available or assigned subscriber numbers of a subscription, i.e. the multiple subscriber identities associated with a particular subscription, different associated service profiles can be created. The services bound to each or a particular one of the optional subscriber identities may include, e.g., a "call screening" function, different invoicing, so-called permanent-number service, suppression of the calling number, and so on.

The procedure of the invention allows the user to be assigned an optional number of subscriber numbers, each associated with an optional service profile determined or defined by user selection. To make a call via a subscription according to the invention, the user will normally dial either a mere B-number, i.e. the desired receiver number, and/or a given identifier before the B-number. In the latter case, the system automatically changes the A-ID to be sent, in accordance with or dependent on the identifier disclosed or entered by the user. In the incoming direction, the system changes the A-ID by adding before it the same identifier that is used when making an outgoing call using the telephone number concerned. When, the other hand, a call is made to a physical number, the call will be given no special treatment but the number is displayed directly as such.

The present invention provides the advantage that the procedure can be employed without regard to the particular telephone system and/or terminal. It is only required that the terminal have a display for displaying the caller's number and/or that it permits the entry of above-decadal characters. The network is required to provide signaling support for transmission of the caller's number. In practice, the A-ID is currently always included or signaled in mobile communications and in wired networks when the subscription is digital. In the near future, a new service accommodating calling-number display will be introduced in the NMT-900 (Nordic Mobile Telephone) network as well.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE CURRENTLY PREFERRED EMBODIMENTS

Figure 1:
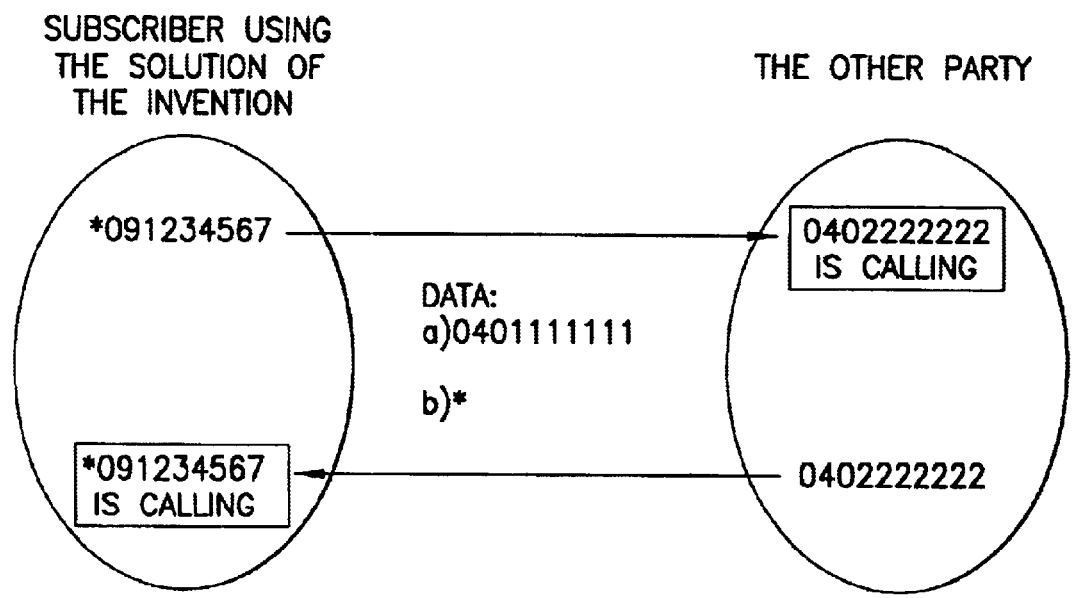
FIG. 1 presents an example of the procedure of making and/or receiving a call with an alternative subscriber number.
Figure 2:
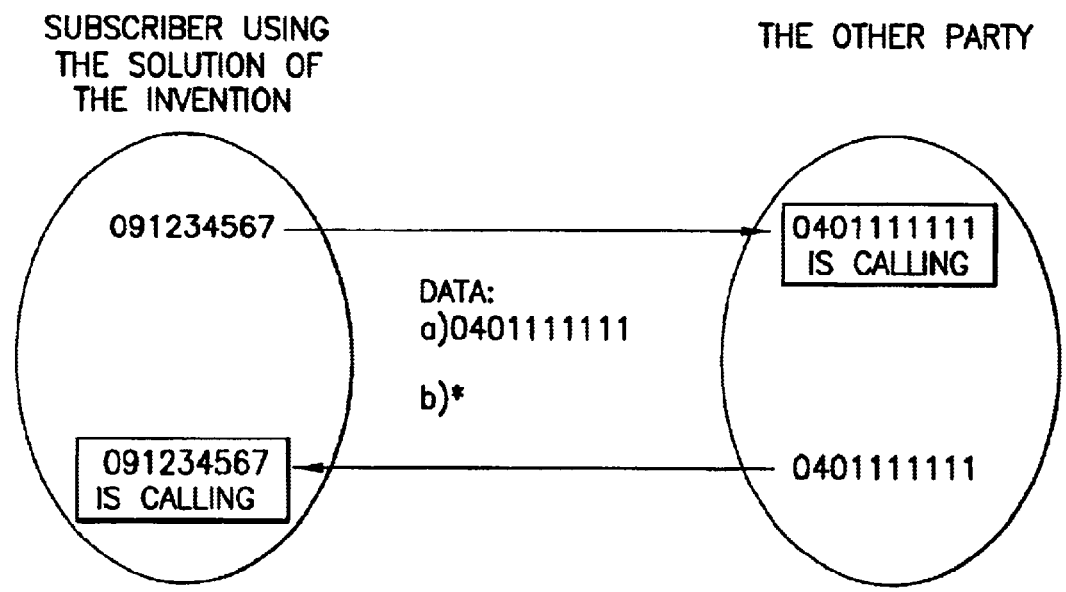
FIG. 2 presents an example of the procedure of making and/or receiving a call with a physical subscriber number.

The examples of FIGS. 1 and 2 illustrate a service comprising only two subscriber numbers, to a subscription, but the service may comprise any optional number of assigned or available subscriber numbers, which only have to be distinguished using different identifiers. In FIG. 1, calls are made and/or received using the subscriber's alternative subscriber number. The identifier or asterisk * in FIG. 1 represents an identifier that is fed or entered into the telephone and detected when calls are received. This identifier may be any kind of symbol, depending on the capabilities of the associated telephone exchange. It may be, for example, an optional row of figures and/or may contain above-decadal characters, such as an asterisk, square, etc.

Figure 3:
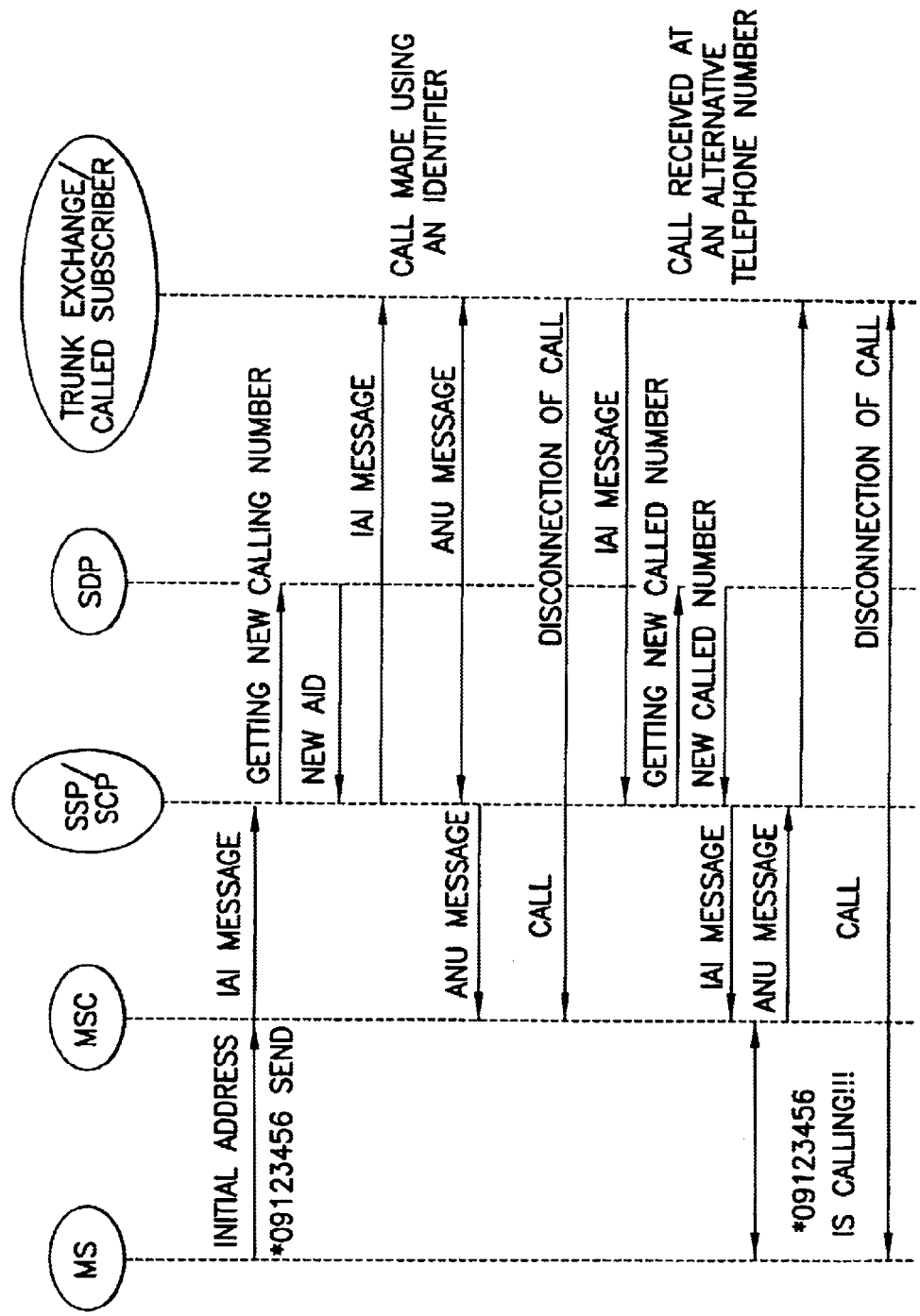
FIG. 3 presents a signaling diagram illustrating the way that a call is made and/or received with an alternative subscriber number in an embodiment of the invention utilizing an intelligent network.

FIG. 3 shows a signaling diagram representing the way in which a call is made and/or received using an alternative subscriber number in an embodiment of the invention utilizing an intelligent network. In a preferred embodiment of the procedure of the invention, existing network elements and/or a register and control unit, such, for example, as an intelligent network register, are utilized in a new way. In the intelligent network, a separate database register is provided for each A-subscription, and in which the alternative subscriber numbers for the particular subscription are stored. As shown in FIG. 3, when the user makes and/or receives a call using an alternative subscriber number, control of the call is handed over to the intelligent network, the information in the intelligent network database is modified, and the new identity is included in the signaling in the telephone network.

The system of the invention comprises a call connection and control component, a database component and a service management system. In a preferred embodiment, these are network elements consistent with the intelligent network architecture IN: SSP (Service Switching Point), SCP (Service Control Point), SDP (Service Data Point, intelligent network database) and SMS (Service Management System). They need not be separate devices but can be integrated with each other, depending on the implementation of the intelligent network. An IP (Intelligent Peripheral) may be connected to the SSP and/or MSC (Mobile Switching Center). The SDP may be implemented or included in the SCP. In one embodiment, the SCP may comprise a SDF (Service Data Function) and/or a DB (Database). A more comprehensive idea of intelligent networks can be obtained from ITUT recommendations Q.121X or Bellcoren AIN recommendations, which are incorporated by reference herein.

In addition, the system is connected to public telecommunication networks, such as the PSTN (Public Switched Telecommunications Network) and/or mobile communications networks (MCN), which comprise telephone exchanges such, for example, as GSM (Global System for Mobile Communications) and/or PSTN PTX (Public Telephone Exchange) exchanges, to which the subscribers are connected. Calls are connected to the SSP of the service according to selection, based on an analysis of the called subscriber number. When a call is made by entering an optional identifier before the telephone number, i.e. before the called-subscriber number, the telephone exchange will automatically route all calls made with that identifier to the switching point regardless of the telephone number.

The service switching point and the subscriber's telephone exchange may physically belong to the same system. In one embodiment, the MSC may be provided with intelligent network SSP functions.

The decisions regarding the routing of calls may also be made using a subscriber-specific ICK (IN Category Key), in which case only calls dialed with a certain identifier by subscribers who have joined the service, as opposed to all calls dialed with that identifier, will be routed to the IN switching point of the service.

In a preferred embodiment of the procedure of the invention, a user of a subscriber line in the telecommunications network can be assigned different numbers and/or service profiles, as, by way of example, for duty calls and for private calls. For example, the invention allows easier monitoring of the billing of calls made by an employee from a company-owned mobile telephone, because the user of the subscription can make off-duty or non-employer-related calls using an alternative number of the same subscription. If necessary, the alternative numbers of a subscription can be associated with different service profiles than the physical subscriber number so that, for instance, a given alternative number is associated with particular services such as inhibition of certain calls, suppression of calling number, special rates and similar optional services.

Thus, by making a selection, i.e. by entering a given identifier before the so-called subscriber-number, the user is able to achieve or associate the call with an optional service profile and/or to use several different subscriber numbers with the same telecommunication network subscription, i.e. with the same SIM (Subscriber Identity Module) and/or telecommunication network terminal.

On the other hand when receiving calls, the user of a subscription can see from the new type of number display which one of the subscription numbers is receiving the call, i.e. whether it is a duty (e.g. employment-related) call or a private (personal) call. If the number of the incoming call is not preceded by an identifier for an optional number, then the call will be connected to the normal physical subscriber number, in which case the number of the incoming call is displayed as such.

In FIGS. 1 and 2: the asterisk * represents an identifier, i.e. it is not a code to be used.

In FIG. 3:

NETWORK ELEMENTS

MS (Mobile Station) means telephone subscription (e.g. mobile telephone).

MSC (Mobile Switching Center) means the caller's telephone exchange (e.g. GSM switching center).

SSP/SCP (Service Switching Point/Service Control Point) means a unit for the switching and control of services (e.g. intelligent network structure).

SDP (Service Data Point) means the database used by the service (e.g. intelligent network structure).

MESSAGES

Initial Address message initiates call from telephone.

Getting New Calling Number message is a request to return a new calling number by giving the old A-ID and an identifier.

New Aid message returns an alternative calling number for the subscriber.

Getting New Called Number message is a request to return the subscriber's physical subscriber number for the routing of the call to the telephone (old called number as input data).

New Called Number message returns the physical subscriber number to the subscription.

IAI means Initial Address with additional Information (TUP).

ANU, ANswer-Unqualified is a message indicating that the called subscriber is answering (TUP).

CLF, CLear Forward is a call setdown message (TUP).

=> Disconnection of the call is detected when the SSP receives a CLF message in accordance with TUP.

CLF means Clear Forward, i.e. a message sent when the call is disconnected.

Figure 4:
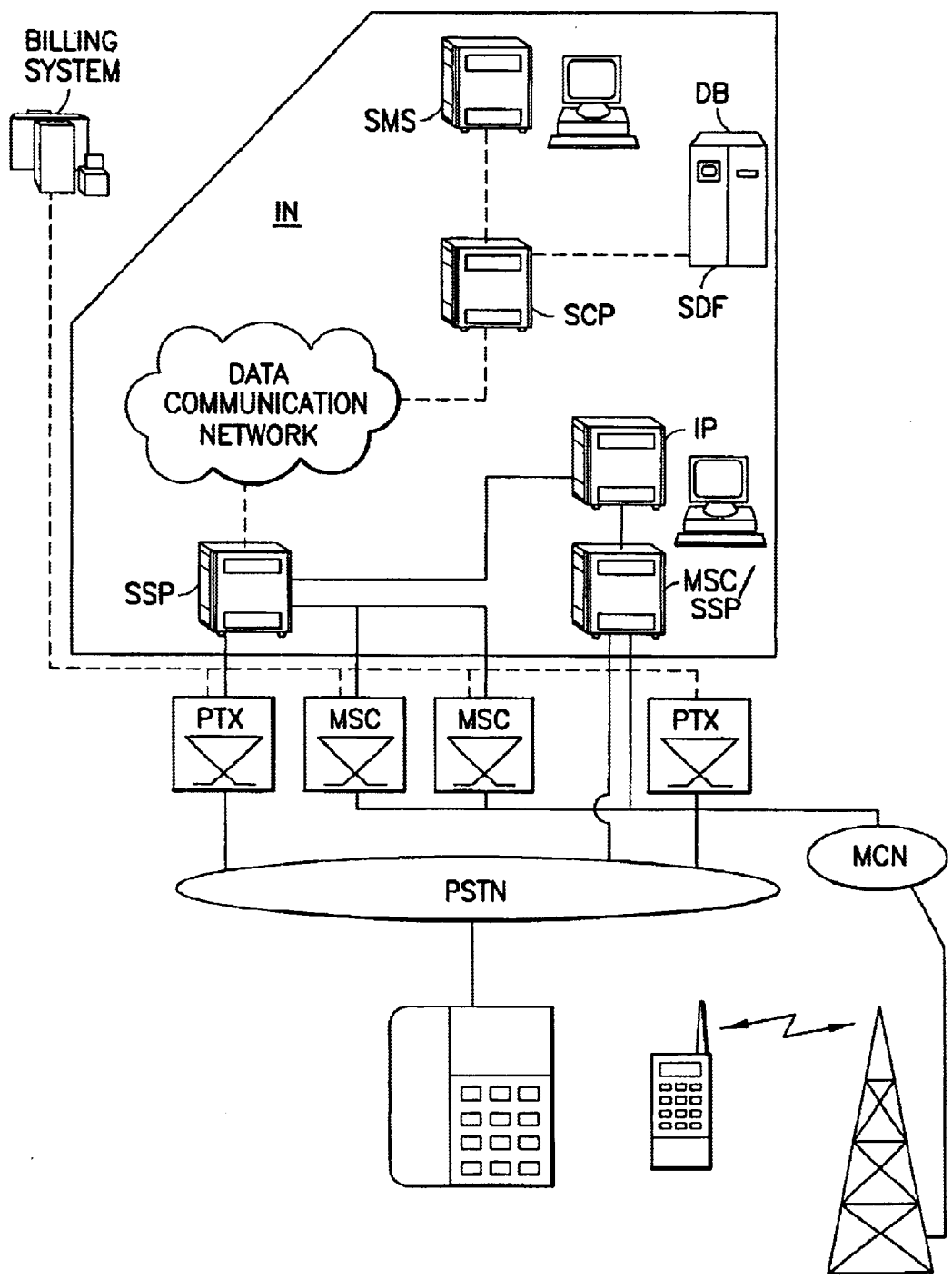
FIG. 4 presents an example of implementing an intelligent network that can be utilized in an embodiment of the procedure of the present invention.

In FIG. 4:

telecommunication network signaling voice and/or signaling

Control and/or operation signaling

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. Method for creating a service profile dependent on user selection for a subscription in a telecommunication network, comprising the steps of:

creating a subscription-specific database (SDP) in the telecommunication network, in which database is stored an optional number multiplicity of a calling subscriber's numbers, each associated with an optional service profile of the calling subscriber, and directing a call to a service switching/control point (SSP/SCP) after a call number analysis of the subscription concerned has been performed in the telecommunication network exchange (MSC, PTX);

fetching, for outgoing calls, a new calling subscriber's number from the database (SDP), to be used as an equivalent for the old physical calling subscriber's number, and/or for an identifier associated with an optional subscriber number and entered by the user of the subscription, and activating the new calling subscriber's number for the subscription and including it in the signaling in the telecommunication network, whereby the system automatically changes the calling subscriber's number to be sent, in accordance with the identifier selected by the user, when receiving calls addressed to an alternative subscriber number, fetching a physical called-subscriber subscriber number corresponding to the old called-subscriber number from the database (SDP), connecting the call based on the physical called-subscriber subscriber number, and modifying the calling subscriber's number by adding in front of it the same identifier that is used when making calls with the optional subscriber number in question.

2. The method of claim 1, wherein the telecommunication network is an intelligent network.

3. The method of claim 1, wherein the optional service profiles associated with each of the optional numbers define different service characteristics for each of the optional numbers.

* * * * *